United States Patent
Lee et al.

(10) Patent No.: US 9,772,906 B2
(45) Date of Patent: Sep. 26, 2017

(54) DISASTER RECOVERY SYSTEMS AND METHODS

(71) Applicant: Unitrends, Inc., Columbia, SC (US)

(72) Inventors: Kevin Sin Yee Lee, North Point (HK); Hiroshi Wada, Parramatta (AU); Jorke Samuel Odolphi, Balmain (AU)

(73) Assignee: Unitrends, Inc., Columbia, SC (US)

( * ) Notice: Subject to any disclaimer, the term of this patent is extended or adjusted under 35 U.S.C. 154(b) by 42 days.

(21) Appl. No.: 14/814,288

(22) Filed: Jul. 30, 2015

(65) Prior Publication Data

US 2017/0031784 A1 Feb. 2, 2017

(51) Int. Cl.
*G06F 11/00* (2006.01)
*G06F 11/14* (2006.01)

(52) U.S. Cl.
CPC ...... *G06F 11/1451* (2013.01); *G06F 11/1471* (2013.01); *G06F 2201/84* (2013.01)

(58) Field of Classification Search
CPC ............. G06F 11/1451; G06F 11/1458; G06F 11/1469; G06F 11/1471; G06F 2201/84
See application file for complete search history.

(56) References Cited

U.S. PATENT DOCUMENTS

| | | | |
|---|---|---|---|
| 9,430,335 B2* | 8/2016 | Jin | G06F 11/1451 |
| 2010/0088492 A1 | 4/2010 | Chakradhar et al. | |
| 2012/0124105 A1 | 5/2012 | Provenzano | |
| 2012/0215998 A1 | 8/2012 | Sharp et al. | |

OTHER PUBLICATIONS

U.S. Office Action on U.S. Appl. No. 14/814,285 dated Sep. 28, 2016.

\* cited by examiner

*Primary Examiner* — Joseph Kudirka
(74) *Attorney, Agent, or Firm* — Foley & Lardner LLP; John D. Lanza

(57) ABSTRACT

An illustrative method for storing disaster recovery data includes receiving a plurality of copies of data stored by a first memory device. Each of the plurality of copies includes a plurality of blocks of data. The method also includes storing, in a second memory device, the plurality of copies in an object-oriented format, determining, using recovery time objectives, a number of the plurality of copies to be stored in a block-oriented format, and selecting a subset of the plurality of copies having the determined number of the plurality of copies. The method further includes assigning each of the other copies of the plurality of copies to one of a plurality of clusters. Each cluster of the plurality of clusters includes one of the subset of the plurality of copies. The method also includes determining, for each cluster, a copy having a highest number of blocks also present in the other copies of the cluster and storing, in the block-oriented format, the determined copy from each cluster in a third memory device.

20 Claims, 8 Drawing Sheets

DISASTER RECOVERY SYSTEMS AND METHODS

FIELD

The present disclosure relates generally to improved disaster recovery for a computer platform and more specifically to aspects of selecting, prior to a recovery event, one or more snapshots for warming using a recovery time objective for the platform.

BACKGROUND

The following description is provided to assist the understanding of the reader. None of the information provided or references cited is admitted to be prior art. Computer backup systems are used to restore computer memory after the computer memory has been corrupted or otherwise fails the user. Cloud-based backup systems can be used by the user for a fee. In general, for a given backup system, a backup product with a faster recovery time is more expensive than a backup product with a slower recovery time. Many systems, however, fail to maximize the overall performance of a computer backup system for a given cost or fail to provide the cheapest backup solution for a given desired recovery time.

SUMMARY

An illustrative method for storing disaster recovery data includes receiving a plurality of copies of data stored by a first memory device. Each of the plurality of copies includes a plurality of blocks of data. The method also includes storing, in a second memory device, the plurality of copies in an object-oriented format, determining, using recovery time objectives, a number of the plurality of copies to be stored in a block-oriented format, and selecting a subset of the plurality of copies having the determined number of the plurality of copies. The method further includes assigning each of the other copies of the plurality of copies to one of a plurality of clusters. Each cluster of the plurality of clusters includes one of the subset of the plurality of copies. The method also includes determining, for each cluster, a copy having a highest number of blocks also present in the other copies of the cluster and storing, in the block-oriented format, the determined copy from each cluster in a third memory device.

An illustrative system for storing disaster recovery data includes a first disaster storage memory device, a second disaster storage memory device, and a processor. The first disaster storage memory device stores, in an object-oriented format, a plurality of copies of data stored by a first memory device. Each of the plurality of copies includes a plurality of blocks of data. The second disaster storage memory device stores, in a block-oriented format, a number of the plurality of copies. The processor is operatively coupled to the first disaster storage memory device and the second disaster storage memory device. The processor determines, using recovery time objectives, the number of the plurality of copies, selects a subset of the plurality of copies having the determined number of the plurality of copies, and assigns each of the other copies of the plurality of copies to one of a plurality of clusters. Each cluster of the plurality of clusters includes one of the subset of the plurality of copies. The processor also determines, for each cluster, a copy having a highest number of blocks also present in the other copies of the cluster and stores, in the second disaster storage memory device, the determined copy from each cluster in the second disaster storage memory device.

An illustrative non-transitory computer-readable medium has computer-readable instructions stored thereon that, upon execution by a processor, cause a device to perform operations. The instructions include instructions to receive a plurality of copies of data stored by a first memory device. Each of the plurality of copies includes a plurality of blocks of data. The instructions also include instructions to store, in a second memory device, the plurality of copies in an object-oriented format, instructions to determine, using recovery time objectives, a number of the plurality of copies to be stored in a block-oriented format, and instructions to select a subset of the plurality of copies having the determined number of the plurality of copies. The instructions further include instructions to assign each of the other copies of the plurality of copies to one of a plurality of clusters. Each cluster of the plurality of clusters includes one of the subset of the plurality of copies. The instructions also include instructions to determine, for each cluster, a copy having a highest number of blocks also present in the other copies of the cluster and instructions to store, in the block-oriented format, the determined copy from each cluster in a third memory device.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The present disclosure may take form in various components and arrangement of components and in various methods. The drawings are only for purposes of illustrating example embodiments and alternatives and are not to be construed as limiting the disclosure. The drawings are not necessarily drawn to scale. Throughout the drawings, like element numbers are used to describe the same parts throughout the various drawings, figures and charts.

DETAILED DESCRIPTION

Figure 1:
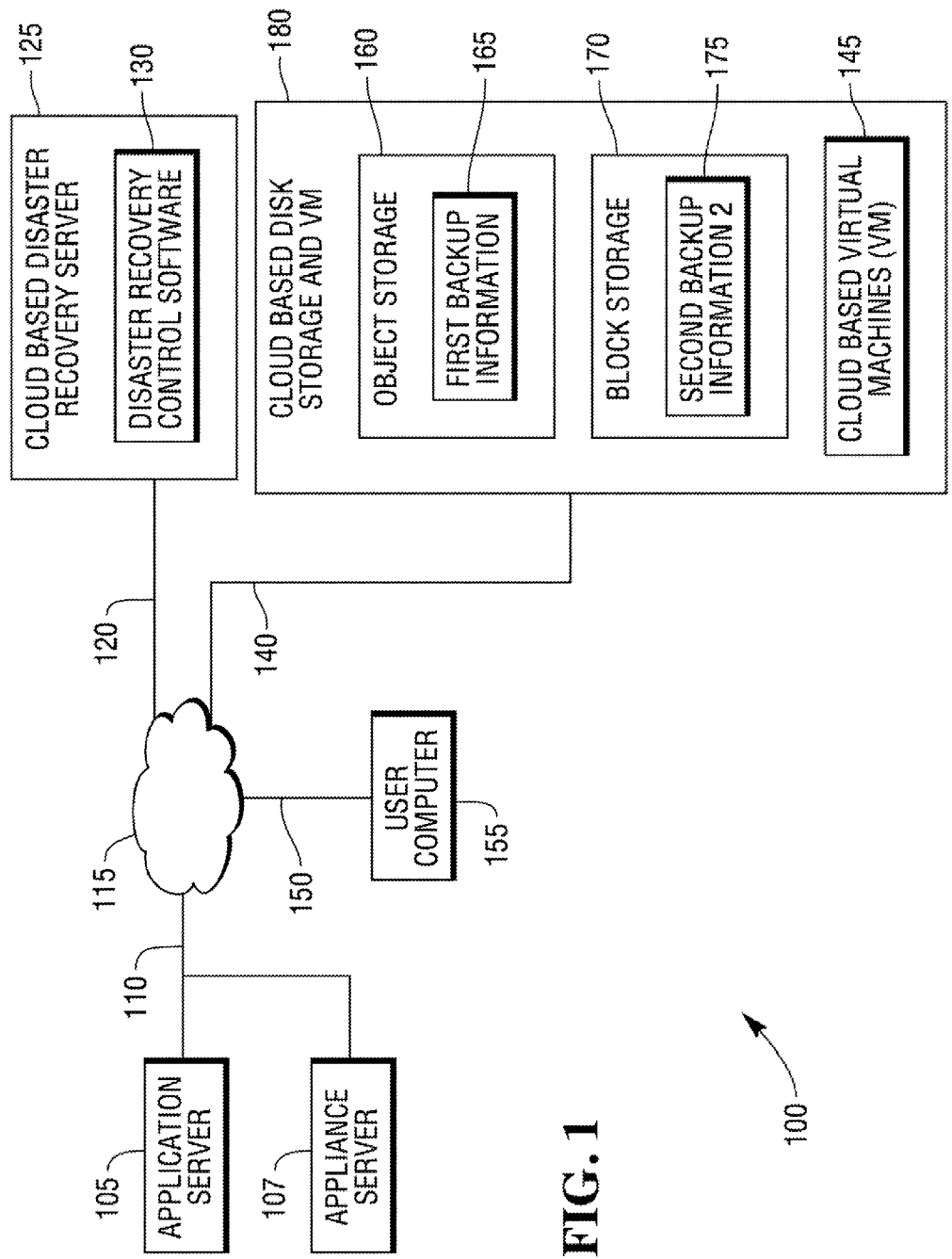
FIG. 1 is a block diagram of a disaster recovery system in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Many computing systems (including one or more computers) implement some level of disaster recovery. A disaster recovery plan often includes one or more techniques for backing up part or all of the data, software, and information used to operate a computer or a computer system so that the functionality of the computer or computer system can be recovered in the event of a disaster or interruption to normal operations. In some instances, the more critical the application performed by the computer is, the higher the level of disaster recovery that is implemented by the computer. In some instances, a computer can be backed up (or restored) for any suitable reason.

Disaster recovery systems may suitably provide the ability to backup and restore individual servers (or other computing devices) both at the physical and virtual level and may provide the ability to recover the functionality of the server, for example, in the event of a disaster that renders the server unusable or inaccessible. The backups may be bare-metal backups that restore a new server from a blank or "bare metal" state to the state of the server sometime before the failure including its operating system and application. In some embodiments, the backups may be incremental backups where only changed data or software is stored. In other embodiments, a combination of backup techniques are used.

In some embodiments, a disaster recovery solution for a computer server includes backing up the programs, data, and infrastructure information to recover the function of the computer server on another machine. The infrastructure information for the computer server can include a description of the network configuration attached to the computer server, the network routing and address information used by the computer server to communicate over the network, etc. In some embodiments that employ a cloud-based disaster recovery solution, the functions of the backed-up computer server are recovered on a cloud-based virtual machine using cloud-based data storage.

Business decisions may suitably dictate certain performance requirements. One example of a performance requirement is the amount of time during a day that a web site, feature, or function must be available to users. An availability requirement can be translated into a recovery time objective (RTO). In some embodiments, the RTO specifies, among other things, the maximum time it should take to recover from a disaster. Failure to meet an RTO in a disaster may trigger financial penalties or other negative contractual events for the customer or user of the recovery system. However, there is a cost for maintaining a disaster recovery system. The cost includes the amount of storage required for the backups and speed of recovering data from the storage. Faster recovery times typically require that backups be stored in faster, more expensive storage devices. However, in some instances, the cost of the fast storage devices can make the cost of the recovery system too expensive for the business needs.

In many instances, the cost to maintain a recovery function for a computer and the speed with which the computer can be recovered after a disaster event are inversely related to each other. Put another way, in many instances, the cost to maintain the ability to have a fast recovery is higher than the cost to maintain the ability to have a slower recovery.

In some embodiments, the cost to recover a computer and the speed with which the computer can be recovered is directly controlled by the type of data storage used to store data from the computer that is needed to recover the computer. In some instances, object-oriented (e.g., object-based) storage is used. In other instances, block-oriented (e.g., block-based) storage is used. In yet other instances, a combination of object-oriented and block-oriented storage is used.

Object-oriented storage is a storage architecture that manages data as objects, such as files. For example, an object-oriented storage system can organize the data stored on a computer such that individual files are kept in-tact. That is, the objects are treated as a whole. Each object can include data, metadata, and an identifier. In some instances, each object can be a single file. In other instances, each object can have multiple files. In alternative embodiments, any suitable object-oriented storage system can be used.

Block-oriented storage is a storage architecture that manages data as blocks of bits/bytes. In some instances, the blocks of data for a given set of data (e.g., a storage device of a computer) are the same size. "Blocking" refers to the process of breaking up a larger set of data into blocks. Each block can contain one or more files and can contain one or more partial files. For example a first portion of a file can be at the end of a first block, and the second portion of the file can be at the beginning of a second block. The first and second blocks can be consecutive, and the first and second portions of the file can be, together, the entire file. In alternative embodiments, any suitable block-oriented storage system can be used.

In many instances, the user of a computer sets limits on the cost incurred to maintain a recovery function for the computer. Thus, some embodiments can set a recovery time after a disaster that is dependent on the type of function provided by the computer.

In some embodiments, the disaster recovery system may suitably be a cloud-based solution that uses the Internet for at least a portion of the communication path to the backed-up computer. In some embodiments, the cloud-based solution is based on computers that support a virtual machine and virtual data storage that can be configured to emulate the environment of the backed-up computer.

In some embodiments, a computer server may suitably be implemented as a real physical computer that executes an operating system and applications. In alternative embodiments, a computer server can be implemented as a virtual machine that executes an operating system and applications in a virtual environment. A virtual machine is an emulation of a particular computer architecture. The virtual machine provides the full functionality of the emulated architecture. A real physical computer server may support multiple (and/or different) virtual machines at the same time.

Disaster recovery solutions may suitably be implemented as a local solution or a cloud-based solution. In local disaster recovery solutions, the computers and systems being backed up and the disaster recovery solution may suitably be commonly owned and communicate with each other over a local or private network. In alternative embodiments, the computers and systems can include remote devices that can communicate via the Internet 115. The computers being backed up and the recovery computer may be local to each other or may be in separate locations. For example, the recovery computer may be in a different building on the same campus or in a different location in another region of the country or the world. The computers and servers being backed up may perform a number of different functions and, as such, the various computers and servers may not all be configured identically. In some embodiments, while the computer servers used to recover the backed up computers and servers may have the same hardware configuration, their virtual software and network environments can be configured to emulate the backed-up computer or server.

In some illustrative embodiments, a server is a computer used to provide certain features or functions to users and/or other computing devices. In various embodiments, the server may be a web server, a database server, a disk server, a media server, etc.

In some instances, it is not possible (or not practical) to provide physical hardware and network architectures that are identical to all the computers and systems that are being backed up. In some embodiments, to provide as much flexibility as possible, cloud-based disaster recovery solutions use virtual machines and virtual network switches. The virtual machines can be quickly configured to emulate a real physical server that is being backed up or a virtual machine running an application that is being backed up. The virtual network switches can be configured using low-level building block functions to emulate the network environment or infrastructure of the backed-up computer or system.

FIG. 1 is a block diagram of a disaster recovery system 100 in accordance with an illustrative embodiment. In alternative embodiments, additional, fewer, and/or different elements may be used. The system 100 includes an application server 105 connected to the Internet 115 over a network 110. In alternative embodiments, the Internet 115 may not be used and the various networks can be connected via any suitable means. In some embodiments, the server 105 executes applications that provide a service to customers over the Internet 115. It should be noted that the application server 105 may suitably be referenced as a source server 105 or source application server 105. The system 100 also includes an appliance server 107 which communicates with the application server 105 and is also connected to the Internet 115 over the network 110. In alternative embodiments, the application server 105 and the appliance server 107 can be remote from one another and/or can be connected to one another through the Internet 115.

The system 100 further includes a user computer 155 connected to the Internet 115 over a network 150. In alternative embodiments, the user computer 155 can be connected to one or more of the servers illustrated in FIG. 1 through any suitable communication media. In an illustrative embodiment, the user computer 155 communicates with the server 105 over the Internet 115 and the server 105 provides a function to the user computer 155. In different embodiments, the server 105 provides different functions to the user computer 155. For example, the server 105 may suitably implement a web server and provide web pages that are accessed by the user computer 155. In some embodiments, communication over the Internet 115 includes using a virtual private network (VPN) connection.

In some embodiments, cloud-based products and solutions are referred to as hosted services and are provided over the Internet 115. Such services can be provided rapidly when needed and released when no longer required. In some instances, the term "cloud" is synonymous with the Internet 115 or communications, services, and transactions that use the Internet 115 for at least a part of a transmission to one or more computers that provide a service. Although various elements are referred to as "cloud-based," in alternative embodiments, such elements may not be cloud-based and may communicate via any suitable method. In some embodiments, the various components that are described as connected via the Internet 115 and/or via the cloud are directly connected and/or are of the same computing device.

The system 100 further includes a cloud-based disaster recovery server 125 connected to the Internet 115 over a network 120. In some embodiments, the disaster recovery server 125 implements disaster recovery control software 130. The disaster recovery control software 130 coordinates the various operations that make up the disaster recovery system. In alternative embodiments, any suitable computing device or method can be used to coordinate operations of the disaster recovery system. In some embodiments, to the disaster recovery control software 130, the server 105 is known as the source computer 105 because it is the computer being backed up for recovery. In alternative embodiments, any computing device can be the source computer to be backed up.

The system 100 further includes cloud-based disk storage and virtual machines (VM) 180 connected to the Internet 115 over a network 140. The cloud-based disk storage 180 includes two types of virtual mass data storage as a cloud-based service. The first type of data storage is object storage 160. In most instances, object storage 160 has the highest level of data reliability and durability. However, object storage usually has lower data storage performance and lower cost-per-byte of stored data. In most instances, object storage 160 is not used to directly bring up (or spin up) a virtual machine to recover a failed computer. An example of a commercial object-based storage product is Amazon.com Inc.'s S3 (simple storage service) online file storage web service. Another example of a commercial object-based storage product is Google Inc.'s Cloud Storage Platform.

The second type of data storage is block storage 170. In most instances, block storage 170 has the advantage that a virtual machine can be spun up directly from data stored in block storage 170. Block storage 170 generally has higher data storage performance but has a much higher cost-per-byte of data stored. Data storage performance is a measure of the time required to move data into or out of the storage. Lower performance means that it takes longer to move data. Higher performance means that it takes less time to move data. Virtual machines can be created with data stored in block storage 170. An example of a commercial block storage product is Amazon.com Inc.'s Elastic Block Store (EBS) and Google Inc.'s Compute Engine Persistent Disks.

In an illustrative embodiment, first backup information 165 is stored in object storage 160 and second backup information 175 is stored in block storage 170. The first and second backup information 165, 175 may each suitably include one or more snapshots of the server 105. Each snapshot includes the information to recover the server 105 back to the time the snapshot was taken. The snapshots can be copies of the data stored on the server 105. In alternative embodiments, any suitable computing device can be backed up.

The cloud-based disk storage and virtual machines (VM) computer 180 is connected to the cloud-based disaster recovery server 125 over the network 140, the Internet 115, and the network 120. In an alternative embodiment, the cloud-based disk storage and VM computer 180 is connected to the cloud-based disaster recovery server 125 via any suitable communications method. In some embodiments, the cloud-based disk storage and virtual machines (VM) computer 180 is used to recover servers that are backed up and experience a disaster event. The cloud-based disk storage and virtual machines (VM) computer 180 provides one or more cloud-based virtual servers 145. For example, if an application server 105 fails, a cloud-based virtual machine 145 can be created (or uploaded, etc.) that replicates the application server 105. The cloud-based virtual machine 145 receives the data necessary to replicate the application server 105 from the first and second backup information 165, 175.

Figure 2:
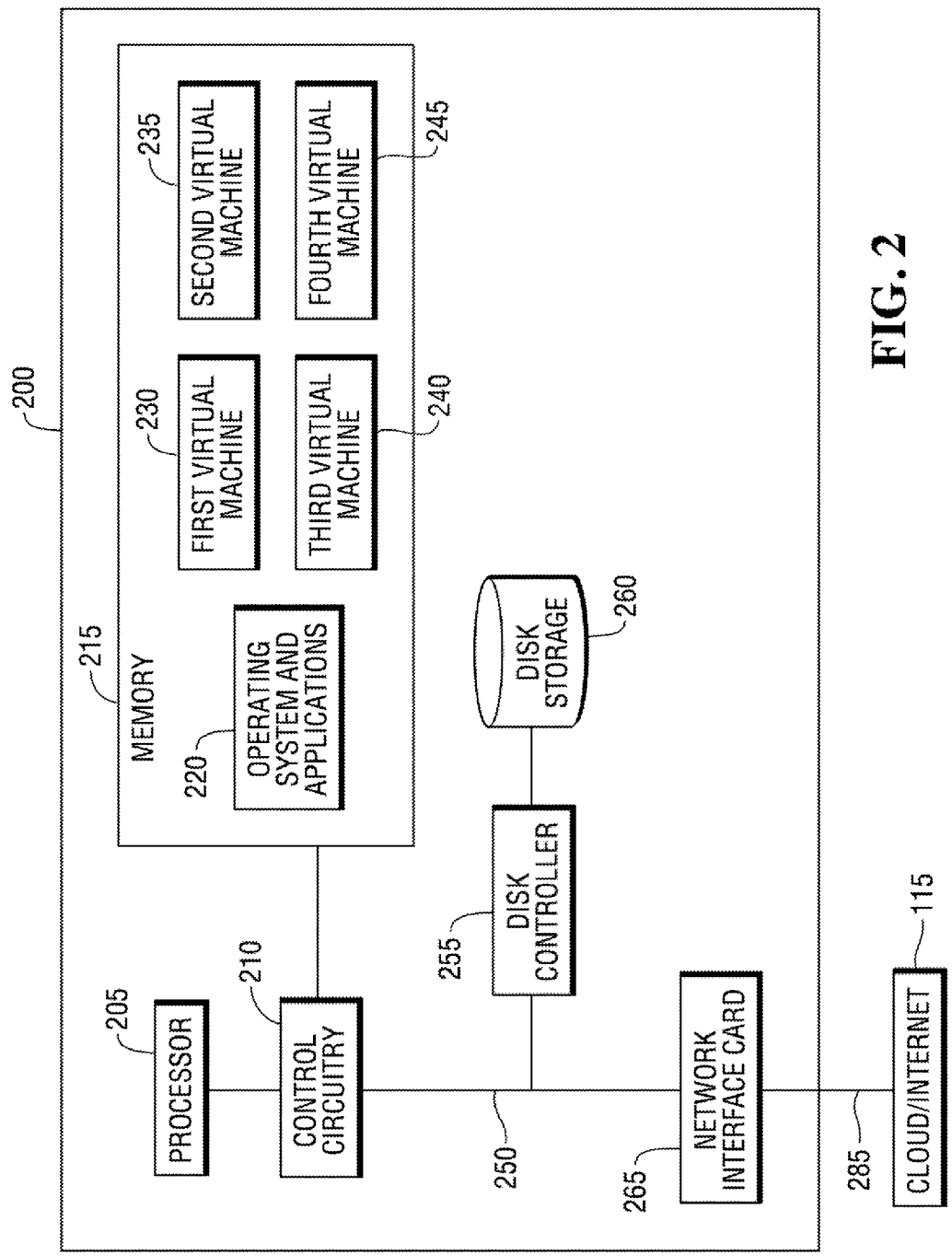
FIG. 2 is a block diagram illustrating a real physical server in accordance with an illustrative embodiment.

The server 105, the cloud-based disaster recovery server 125 and the cloud-based disk storage and virtual machines (VM) computer 180 may suitably be implemented using one or more different configurations of computer hardware and software. FIG. 2 is a block diagram illustrating a real physical server 200 in accordance with an illustrative embodiment. In alternative embodiments, additional, fewer, and/or different elements may be used. The real physical server 200 may suitably be configured to implement one or more of the servers (e.g., 105, 125, and/or 180). In other embodiments, one or more of the servers may suitably be implemented using a converged infrastructure platform as described in U.S. provisional patent application Ser. No. 61/968,137, titled "DISASTER RECOVERY OF CONVERGED INFRASTRUCTURE PLATFORMS," filed on Mar. 20, 2014, having the same assignee as this application and which is incorporated herein by reference in its entirety.

In an illustrative embodiment, the real physical server 200 is used to directly execute applications that perform functions for a client (e.g., a user, another computer, etc.). In alternative embodiments, the real physical server 200 executes software that creates one or more virtual machines (VMs). The one or more virtual machines execute applications that perform the functions for the client. In some embodiments, the real physical server 200 may suitably be used to connect to and manage external disk storage devices that provide large amounts of data storage.

In an illustrative embodiment, the real physical server 200 includes a processor 205, control circuitry 210, a memory 215, a disk controller 255, a disk storage 260, and a network interface card 265. Some embodiments may include one or more network interface cards. The network interface card 165 connects to the Internet 115 (or any other suitable network or device) over a network 285. Additionally in some embodiments, the processor 205 includes multiple processors or processors with multiple cores or a combination thereof.

In an illustrative embodiment, the control circuitry 210 includes components that allow the processor 205 to communicate with: the memory 215 to read and write to the contents of the memory 215; the disk controller 255; and the network interface card 265.

In an illustrative embodiment, the memory 215 uses non-transitory storage devices including one or both of volatile and non-volatile memory. The non-volatile memory may suitably include flash memory and/or other types of solid-state electronic memory and rotating storage devices such as disk drives or the like. Non-volatile memory retains stored information after power is removed from the memory and until power is restored. Computer instructions in the form of an operating system and applications 220 can be stored in the memory 215. When the computer instructions are executed by the processor 205, the instructions cause the processor 205 to control the devices, controllers, and peripherals attached to or part of the server 205 and to perform the functions of the real physical server 200. The applications 220, when executed, may suitably provide features or functions directly or the applications 220 may suitably implement a first, second, third, and fourth virtual machine 230, 235, 240, 245, respectively. When the virtual machines 230, 235, 240, 245 are implemented, one or more of the applications 220 are executed by the one or more of the virtual machines 230, 235, 240, 245 to provide features and functions. Other embodiments of the present disclosure includes additional, fewer, and/or different virtual machines.

In an illustrative embodiment, the disk storage 260 includes one or more disk drives for the storage of digital data. The one or more disk drives may suitably be interconnected by high speed data networks (or by any other suitable connection) and some (or all) of the disk drives may be external to the real physical server 200 and connected by a network. The external disk storage may suitably include racks of disk storage modules located in the same physical location. In alternative embodiments, some of the external disk storage may be located in remote physical locations. In some embodiments, the disk storage 260 provides thousands of terabytes of data storage. In some embodiments, the disk storage 260 also provides different levels of data performance.

In some embodiments, some or all of the disk drives are solid-state disk drives in which the rotating disks of traditional disk drives are replaced by solid-state memory devices that have few to no moving mechanical components. In most embodiments, the solid-state memory devices provide increased performance over rotating disk drives.

In some embodiments, virtual machines (VM) are used to recover failed computers. Virtual machines (VM) are implemented using disk storage 260 in the real physical server 200. However, cloud-based virtual machines can be implemented using cloud-based fast storage.

Figure 3:
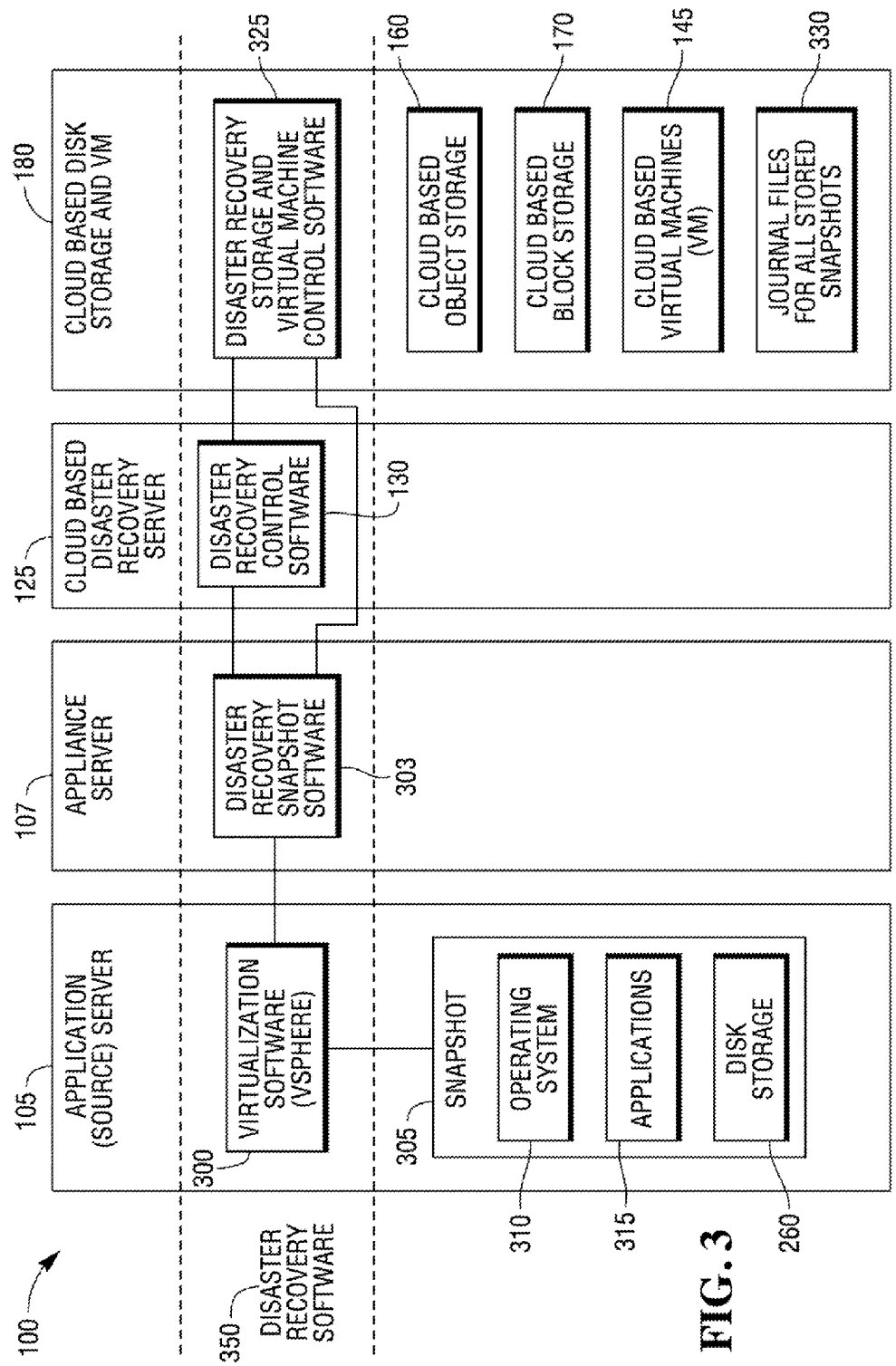
FIG. 3 is a block diagram illustrating an embodiment of disaster recovery software in accordance with an illustrative embodiment.

FIG. 3 is a block diagram illustrating an embodiment of disaster recovery software 350 in accordance with an illustrative embodiment. In alternative embodiments, additional, fewer, and/or different elements may be used. The functions of the disaster recovery software 350 are divided between the application server 105, the appliance server 107, the disaster recovery server 125, and the cloud-based disk storage and VM service 180. A portion of the disaster recovery software 350 resides and executes on each of the devices 105, 107, 125, 180. In alternative embodiments, one or more of the elements shown with one device can be implemented and/or performed by another device.

Virtualization software 300 provides a function of the disaster recovery software 350 and resides on the application server 105. The virtualization software 300 is responsible for capturing snapshots 305 of software and applications executed on the application server 105. Each snapshot 305 is transferred to disaster recovery snapshot software 303 for processing and possible transfer to cloud-based storage. In some embodiments, the virtualization software 300 is implemented using VSphere software produced by VMware Inc.

The disaster recovery snapshot software 303 is part of the disaster recovery software 350 and resides on the appliance server 107. In an alternative embodiment, the appliance server 107 may exist as a virtual machine running on the application server 105. The disaster recovery snapshot software 303 is responsible for: periodically receiving a snapshot of the application server 105; calculating a hash code for each block (or object) of the captured snapshot; determining for each block (or object) of the captured snapshot, if an identical block (or object) has already been stored on the cloud-based disk storage and VM service 180; transferring blocks (or objects) that are not identical to a block (or object) already stored on the cloud-based disk storage and VM server 180; and maintaining a journal file 330 for each captured snapshot that includes information on each block (or object) of the snapshot. Data transferred to the cloud-based disk storage and VM service 180 are stored in cloud-based object storage 160. In some embodiments, the cloud-based object storage 160 costs less and has lower performance than the cloud-based block storage 170. A full snapshot of the application server 105 may suitably include a copy of an operating system 310, applications 315, and data stored on the disk storage 260.

Transferring data from the cloud-based object storage 160 to the cloud-based block storage 170 (sometimes called volume block storage) can usually be a relatively slow process because the data is transferred over at least one network and is reorganized for block storage. In some embodiments, moving large amounts of data from object storage 160 to block storage 170 can require hours to complete. In some embodiments, recovery time objectives (RTO) are used to determine that the recovery of a failed computer be completed in one hour or less. In some instances, recovering a failed computer in one hour or less is not possible or feasible when snapshots are stored (only) in object storage 160.

In some embodiments, when snapshots are received from the appliance server 107, the snapshots are stored in object storage 160 primarily because object storage 160 has the highest reliability and secondarily because object storage 160 generally has lower costs. However, to meet recovery time objectives, some snapshots may be moved into the block storage 170. In some embodiments, deciding which snapshots to transfer to block storage 170 is important to meeting recovery time objectives.

The disaster recovery software 350 may also include the disaster recovery control software 130, which resides in the cloud-based disaster recovery server 125. The disaster recovery control software 130 monitors and controls the high level functions of the disaster recovery system 100. The disaster recovery control software 130 determines (or is informed) that a failure event has occurred (or that a backup computer is to be restored). In response, the disaster recovery control software 130 initiates a recovery for the failed computer, such as the source server 105. The disaster recovery control software 130 also provides customer and field service interfaces to control the features and functions of the disaster recovery system 100. In some embodiments, the disaster recovery control software 130 further manages a recovery time objective 600 (see, e.g., FIG. 6) for each computer that is backed up by the disaster recovery software 350.

In some embodiments, the disaster recovery software 350 includes the disaster recovery storage and VM control software 325. The VM control software 325 communicates with the disaster recovery control software 130 and the disaster recovery snapshot software 303. The VM control software 325 receives requests from the disaster recovery snapshot software 303 to receive and store snapshots in object storage 160. The disaster recovery storage and VM control software 325 also controls the process of warming a snapshot or block and determining which snapshot or block should be warmed. Warming a snapshot includes moving the portions (e.g., blocks) of the snapshot from cloud-based object storage 160 to cloud-based block storage 170. As discussed above, in many embodiments, cloud-based block storage 170 has high performance and can be directly used to create a virtual machine to recover a failed server using a stored snapshot. Cloud-based object storage 160 may not be organized for direct execution by a computer and may not have the performance required to execute the software stored as objects.

Figure 4:
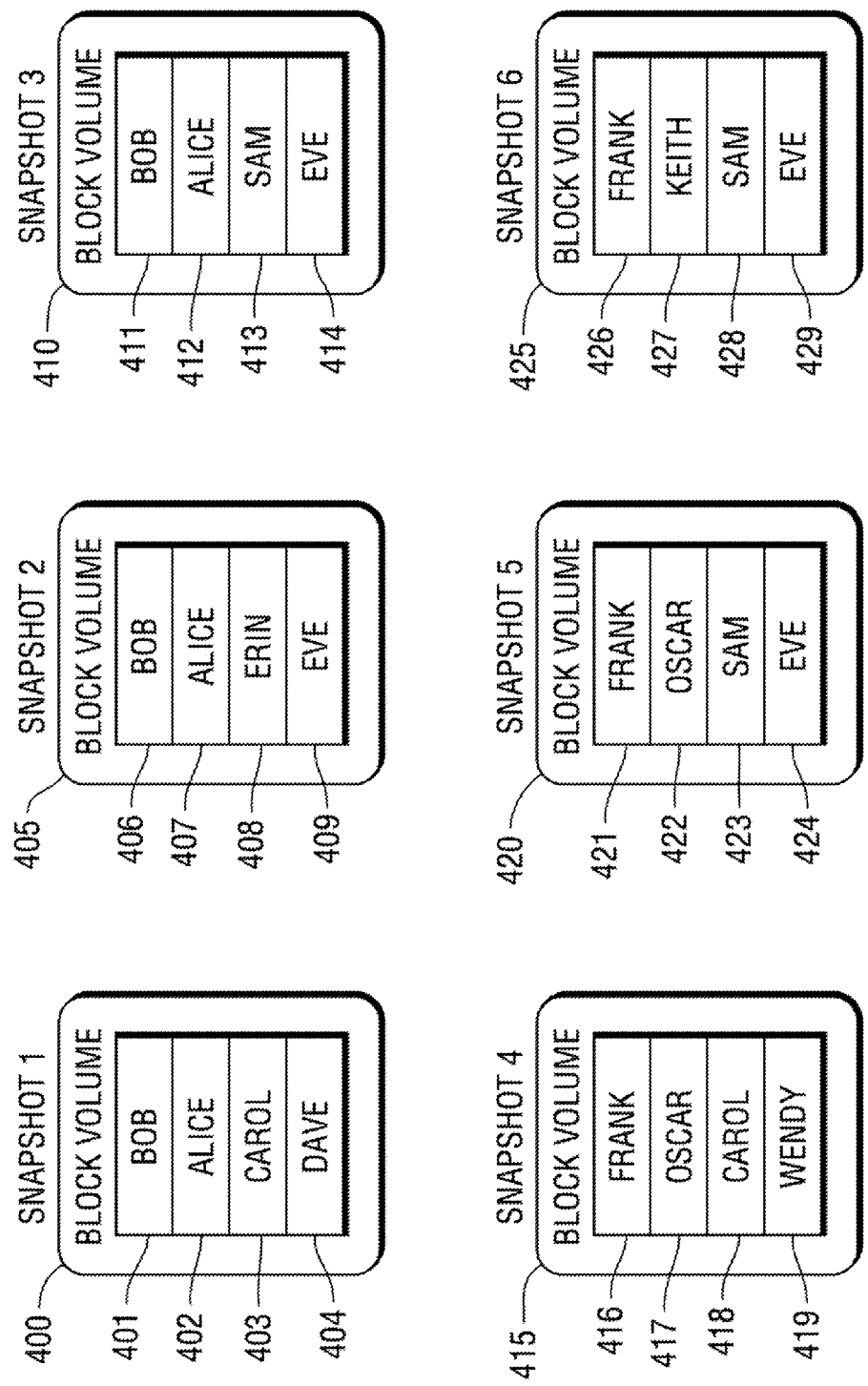
FIG. 4 is an illustration of six snapshots in accordance with an illustrative embodiment.

FIG. 4 is an illustration of six snapshots 400, 405, 410, 415, 420, 425 in accordance with an illustrative embodiment. The snapshots 400, 405, 410, 415, 420, 425 are taken from the source server 105 (or whichever computer is being backed up). Each snapshot is comprised of blocks of data. The size of a block can vary but typically may vary from kilobytes to gigabytes. Each of the six snapshots of FIG. 4 is comprised of four blocks to simplify the examples discussed herein. In alternative embodiments, a snapshot may suitably have thousands or tens of thousands (or more) of blocks. Additionally, in some embodiments, snapshots may have different amounts of blocks. Also, for explanatory purposes, each block is assigned a name to make them easier to recognize. In actual use, such names may not be used to identify blocks. In alternative embodiments, objects may be used in place of blocks.

Blocks with the same name have identical data and the same hash value. In actual use, the hash value is used to determine if two blocks have identical data. Therefore, blocks with the same name are interchangeable with each other. As such, blocks with the same name only need to be transferred to and stored in cloud-based object storage 160 once. After a block has been stored in the cloud-based object storage 160 once, subsequent blocks with the same hash value may not be stored. Rather, in such embodiments, a reference to the prior stored block is used. The actual reference may indicate a location in the object storage 160 or block storage 170, depending upon which device the block is stored in.

Each of the six snapshots 400, 405, 410, 415, 420, 425 is captured by the disaster recovery snapshot software 303 that is executed on the source server 105. The timing for the capture of each snapshot can be determined by parameters maintained by the disaster recovery control software 130. In an illustrative embodiment, the timing for the capture of each snapshot is communicated to the disaster recovery snapshot software 303 from the disaster recovery control software 130. As each block of a snapshot is captured, the disaster recovery snapshot software 303 calculates a cryptographic hash code for the captured block and transmits the hash code to the disaster recovery storage and VM control software 325. The VM control software 325 can use the hash code to determine if an identical block has already been stored. If an identical block has not already been stored in the cloud-based object storage 160, the disaster recovery snapshot software 303 transmits the block to the disaster recovery storage and VM control software 325 for storage in the cloud-based object storage 160.

Snapshot 1 (400) is comprised of blocks "BOB" 401, "ALICE" 402, "CAROL" 403, and "DAVE" 404. Snapshot 2 (405) is comprised of blocks "BOB" 406, "ALICE" 407, "ERIN" 408, and "EVE" 409. Snapshot 3 (410) is comprised of blocks "BOB" 411, "ALICE" 412, "SAM" 413, and "EVE" 414. Snapshot 4 (415) is comprised of blocks "FRANK" 416, "OSCAR" 417, "CAROL" 418, and "WENDY" 419. Snapshot 5 (420) is comprised of blocks "FRANK" 421, "OSCAR" 422, "SAM" 423, and "EVE"

424. Snapshot 6 425 is comprised of blocks "FRANK" 426, "KEITH" 427, "SAM" 428, and "EVE" 429.

Figure 5:
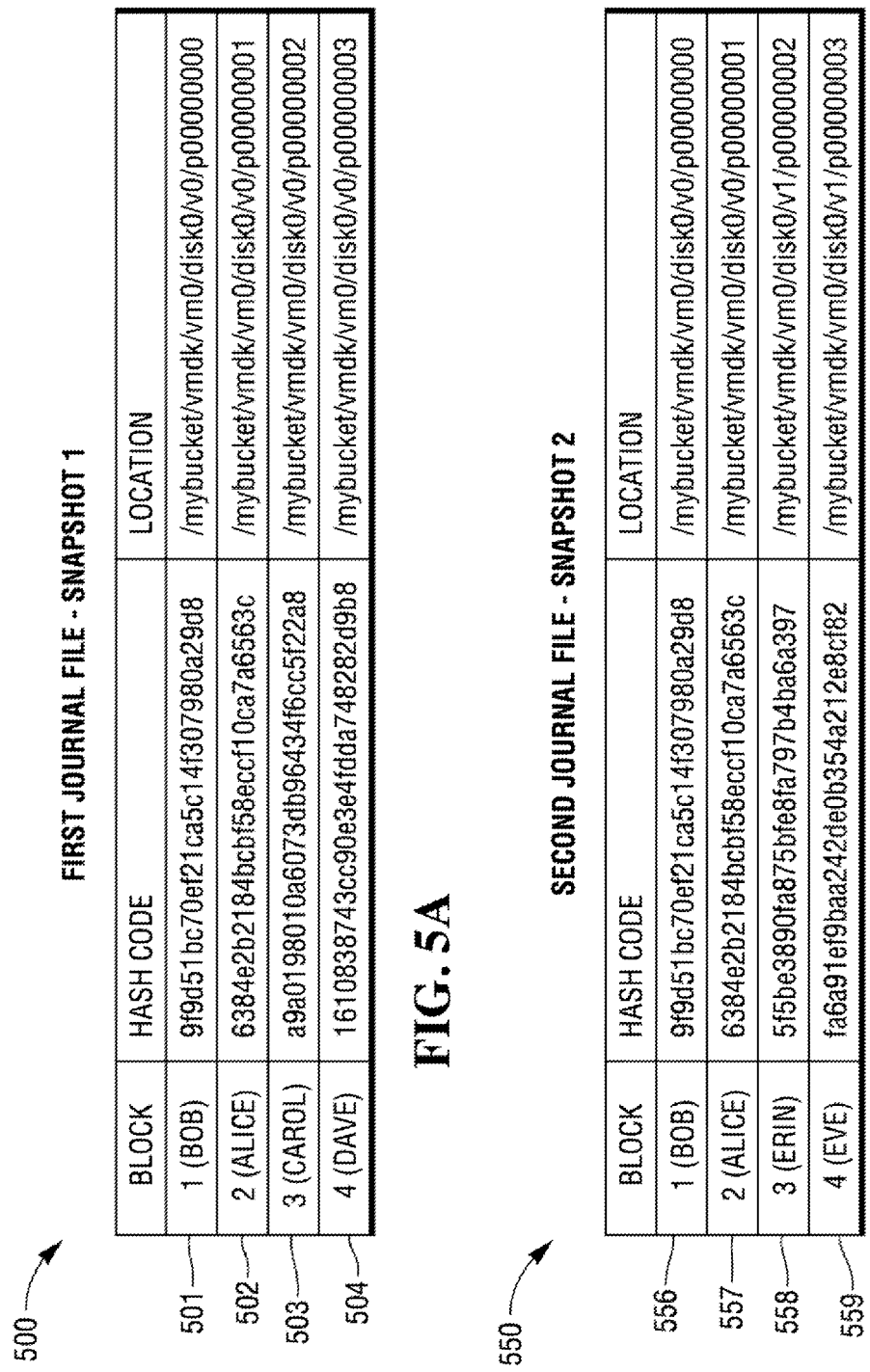
FIG. 5A is a table showing the contents of a first journal file for snapshot 1 of FIG. 4 in accordance with an illustrative embodiment.
FIG. 5B is a table showing the contents of a second journal file for snapshot 2 of FIG. 4 in accordance with an illustrative embodiment.

FIG. 5A is a table showing the contents of a first journal file 500 for snapshot 1 (400) of FIG. 4 in accordance with an illustrative embodiment. The first journal file 500 includes an entry for each block that comprises snapshot 1 (400). The first journal file 500 includes three columns of information for each block stored in the first journal file 500. The first column is an identifier for the block. In this example, the blocks are identified with names. In alternative embodiments, the first column may suitably include an index that indicates to the disaster recovery software 350 where to place the block to recover the original block volume. The second column is the cryptographic hash code for the block that was received from the disaster recovery snapshot software 303. Any suitable hash can be used to determine the cryptographic hash code. The third column is an object handle that identifies where the block is stored in the cloud-based object storage 160. The object handle is used to retrieve the block from the cloud-based object storage 160. Additional information, not shown, can also be included in the journal files. The first journal file 500 for snapshot 1 (400) includes a first entry 501 for block "BOB" 401, a second entry 502 for block "ALICE" 402, a third entry 503 for block "CAROL" 403, and a fourth entry 504 for block "DAVE" 404.

FIG. 5B is a table showing the contents of a second journal file 550 for snapshot 2 (405) of FIG. 4 in accordance with an illustrative embodiment. The second journal file 550 includes an entry for each block that comprises snapshot 2 (405). As with the first journal file 500, the second journal file 550 includes three columns of information for each block stored in the second journal file 550. The first column is an identifier for the block. The second column is the cryptographic hash code for the block that was received from the disaster recovery snapshot software 303. The third column is an object handle that identifies where the block is stored in the cloud-based object storage 160. The object handle is used to retrieve the block from the cloud-based object storage 160. The second journal file 550 for snapshot 2 (405) includes a first entry 556 for block "BOB" 406, a second entry 557 for block "ALICE" 407, a third entry 557 for block "ERIN" 408, and a fourth entry 559 for block "EVE" 409.

It should be noted that block "BOB" and block "ALICE" are common to both snapshot 1 (400) and snapshot 2 (405). The hash code and location information for "BOB" and "ALICE" are the same in the journal files 500, 550 for each snapshot 400, 405. The location information for "BOB" in snapshot 1 (400) is the same as the location information for "BOB" in snapshot 2 (405). The location information for "ALICE" in snapshot 1 (400) is the same as the location information for "ALICE" in snapshot 2 (405). Accordingly, blocks "BOB" and "ALICE" are only stored once in the cloud-based object storage 160.

In some embodiments, the disaster recovery system 100 supports multiple customers at one time. Each customer may have multiple computers that are protected by the disaster recovery system 100 in case of a failure of one of the computers, a communications failure that prevents users from accessing one of the computers, or any other event that requires a backup. Each customer (or any suitable entity) can determine, for example, the frequency that snapshots should be captured (e.g., once per day, once per hour, etc.), the length of time that snapshots should be stored (e.g., one week, one month, etc.), how many snapshots should be stored (e.g., twenty snapshots per device, etc.), etc. In some embodiments, a customer can establish a recovery time objective (RTO) 600 for each computer protected by the disaster recovery system 100. The RTO can be based on the importance and type of data processed by each computer. In some embodiments, the RTO specifies a target recovery time (e.g., once a failure event is identified for a computer). In some embodiments, the RTO specifies a limit to the cost associated with maintaining the resources needed to recover a failed computer.

For example, it may cost 10 cents per month for each gigabyte (GB) of stored data that is used to recover a computer in the object-based storage 160. If a single snapshot uses 100 GBs, it would cost $10.00 per month to store the single snapshot. Thirty snapshots would cost $300. In this example, the data is stored in the cloud-based object storage 160, which is the most economic but also has low performance and may not be used directly as data for a VM. Cloud-based block storage 170 may have higher performance and can be used directly as data for a VM, but the cost can be $1.00 per month per gigabyte. For the 100 GB snapshot, the high performance storage would cost $100 per month for one snapshot. If all 30 snapshots were stored in the block storage 170 cost would be $3000 a month. However, a customer may set a limit (e.g., as an RTO) of $500 per month, which can be based on the value of the function performed by the source computer 105.

In some instances, it can take hours to move a snapshot from object storage 160 to block storage 170 so that the snapshot can be used in a VM to recover a computer. In some cases, for example when the snapshot is very large, it can require 12 to 24 hours to move the data. In instances when most or all of the data is stored in object storage 160, the time to move snapshot data from object storage 160 to block storage 170 can be longer than the RTO specifies as the maximum recovery time. Therefore, based on the RTO, some snapshots should be stored in block storage 170 to reduce the amount of time to recover the computer, thereby satisfying the RTO.

For example, the total number of snapshots of a computer to be stored can be determined (e.g., by a user, by an algorithm, etc.). Based on the size of the computer's data, the cost-per-byte (or bit, kilobyte, word, etc.) for object-based storage, the cost-per-byte for block-based storage, and the total budget, the allocation of the data between the object-based storage and the block-based storage can be determined using any suitable method (e.g., via a simple formula).

In the example in which the RTO includes a cost limit of $500 per month, one possible configuration is 30 snapshots stored in object storage 160 and two snapshots that are stored in block storage 170. In some embodiments, all snapshots are stored in object storage 160 and some snapshots are stored in block storage 170. In an alternative embodiment, some snapshots are stored in object storage 160 and the rest of the snapshots are stored in the block storage 170. Any suitable configuration can be used. One or more of the methods described herein can determine which of the 30 snapshots should be stored in block storage 170 to optimize the chances of meeting (or beating) the recovery time objective.

Within the present disclosure, the process of moving a snapshot from object storage 160 to block storage 170 is called warming or warming up the snapshot. When the snapshot is stored in block storage 170 and "warmed up," the snapshot can quickly be brought up in a virtual machine, sometimes in minutes, to recover the source computer. The source computer is the computer that is protected (e.g., backed up) in case of failure. In some embodiments, the RTO specifies the granularity of the recovery points (also called checkpoints). That is, in such embodiments, the RTO (e.g., cost) can be used to determine how often snapshots of the source computer are taken. In some cases, the customer may select a once-daily recovery point. In alternative embodiments, the customer may select multiple recovery points during a day. In general, the more recovery points, the higher the cost is associated with providing the recovery function for a computer because more snapshots have to be stored in block storage 170 (and/or object storage 160) to meet the recovery objective in the RTO.

In some embodiments, a difference function analyzes two (or more) snapshots and determines which blocks are different between the two (or more) snapshots. For example, if snapshot 1 (400) is stored in the block storage 170 with no shared blocks, the function determines what blocks must be replaced or overlaid to create snapshot 2 (405). For example, set A is equal to the four blocks of snapshot 1 (400) and set B is equal to the four blocks of snapshot 2 (405), as follows:

A={(entry1: BOB), (entry2: ALICE), (entry3: CAROL), (entry4: DAVE)}
B={(entry1: BOB), (entry2: ALICE), (entry3: ERIN), (entry4: EVE)}

The difference function for sets A and B produces the following result set:

diff(A,B)={(entry 3: CAROL), (entry 4: DAVE)}

The difference function for sets B and A produces the following result set:

diff(B,A)={(entry 3: ERIN), (entry 4: EVE)}

Block entry 1 ("BOB") and block entry 2 ("ALICE") are the same for both snapshot 1 (400) and snapshot 2 (405) so there is no difference between the snapshots for entry 1 and entry 2. However, entry 3 and entry 4 are different, so to create a stand alone image in block storage 170 for snapshot 2 (set B) (405) from snapshot 1 (set A) (400), blocks "BOB" 401 and "ALICE" 402 are copied from snapshot 1 (400) and block "ERIN" is overlaid in entry 3 (408) and block "EVE" is overlaid in entry 4 (409)

In some embodiments, a distance function determines the number of different blocks between two snapshots. For example, s1 represents the blocks of snapshot 1 (400) and s2 represents the blocks of snapshot 2 (405). The distance between s1 and s2 is 2 and is depicted as follows:

dist(s1,s2)=2

The distance between two snapshots is calculated by determining the number of different blocks between the two snapshots. For the above example, the function first checks the first entry in the journal file for each snapshot. Since "BOB" is the first entry in both journal files 501, 556, the distance is 0 for the first entry. The function checks the second entry in each journal file. "ALICE" is the second entry in both journal files 502, 557 so the distance is 0 for the second entry. The function checks the third entry in each journal file. "CAROL" 503 is the block for s1 and "ERIN" 558 is the block for s2. Because the blocks are different, the distance is 1 for the third entry. The function checks the fourth entry in the journal file. "DAVE" 504 is the block for s1 and "EVE" 559 is the block for s2. Because the blocks are different, the distance is 1 for the fourth entry. The function adds up the difference values for each entry and determines that the distance between s1 and s2 is 2 because two blocks are different between s1 and s2.

In other embodiments, the distance function uses different methods to determine a distance between two snapshots. For example, a distance function may suitably assign weights to each snapshot where the most recent snapshot has the most weight. For example, the two most recent snapshots (e.g., s1 and s2) can be preferred over the other snapshots. That is, in such an example, the two most recent snapshots can be the two most relevant snapshots in that if the computing device is to be restored, it is likely that the device will be restored using one of the two most recent snapshots. Thus, in some embodiments, methods can be used to increase the chance of choosing the two most recent snapshots to be centroids over the remaining snapshots. For example, when calculating the distance function, a weighting factor can be subtracted from the distance for the two most recent snapshots. Thus, as discussed in greater detail below, when the distances of the snapshots are compared to choose centroids, the first two snapshots will have a greater chance of being chosen as centroids.

Figure 6:
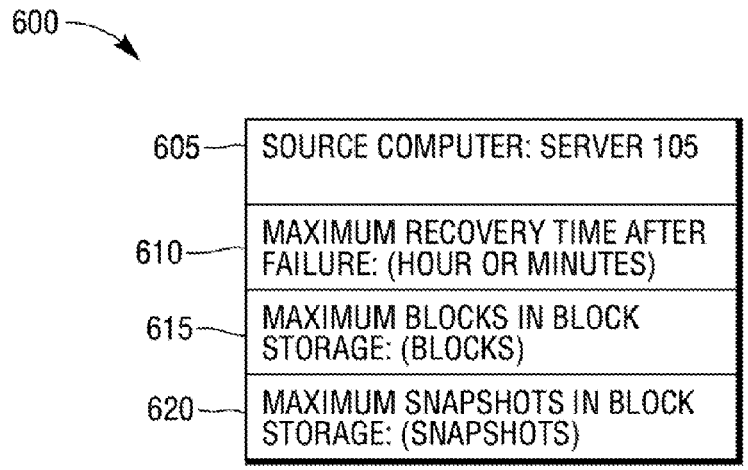
FIG. 6 is a block diagram illustrating the structure of a recovery time objective (RTO) data block in accordance with an illustrative embodiment.

FIG. 6 is a block diagram illustrating the structure of a recovery time objective (RTO) data block 600 in accordance with an illustrative embodiment. In alternative embodiments, additional, fewer, and/or different elements may be used. The RTO 600 has fields such as a source computer 605, a maximum recovery time after failure 610, a maximum number of blocks in block storage 615, and a maximum number of snapshots in block storage 620. Other embodiments may have more or different fields. Computers that are protected by the disaster recovery software 130 have an instance of the RTO 600 that defines the recovery parameters for each computer. Such parameters define a recovery time and may place some limits for the cost of maintaining the recovery function for the computer.

The source computer field 605 identifies the computer that the data block 600 is associated with. In the embodiment illustrated in FIG. 6, the source computer field 605 identifies the application server 105 as the computer associated with the RTO data block 600. The maximum recovery time after failure field 610 defines the maximum amount of time that it should take to recover the computer after recovery has initiated. Recovering a computer means that the applications and services provided by the computer identified in the source computer field 605 are available for use on another computer. The times can range from minutes to hours. In general, shorter times cost more to maintain than longer times.

The maximum number of blocks in block storage field 615 defines the maximum number of data blocks that can be stored in block storage 170 at any time. Block storage 170 is generally more expensive than object storage 160, so field 615 can limit the cost of providing disaster recovery. Reducing field 615 can also increase the time to recover a computer. In most instances, it is cost prohibitive to store all of the blocks in block storage 170, although doing so would provide the fastest recovery time. Therefore, in some embodiments, because not all blocks can be stored in block storage 170, it is important that the blocks that provide for the fastest recovery time are identified and stored in the allowable blocks of block storage 170. Failing to identify the proper blocks can increase the time required to move the needed blocks into the block storage 170 and, thus, increase the recovery time. The maximum snapshots in block storage field 620 can define the maximum number of snapshots that can be stored in block storage 170 at any time.

Figure 7:
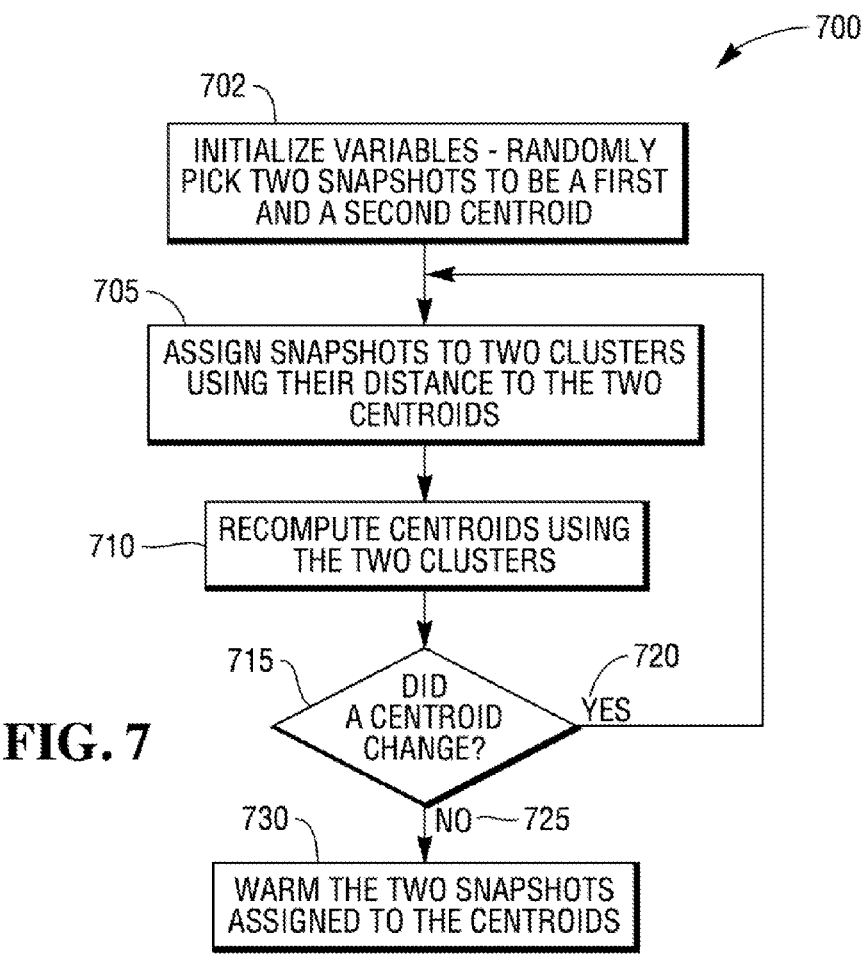
FIG. 7 is a flowchart of a method for determining appropriate snapshots to move to block storage in accordance with an illustrative embodiment.

FIG. 7 is a flowchart of a method 700 for determining appropriate snapshots 400, 405, 410, 415, 420, 425 to move to block storage 710 in accordance with an illustrative embodiment. In alternative embodiments, additional, fewer, and/or different operations may be performed. Also, the use of arrows and the order of listed operations is not meant to be limiting as to the order or flow of operations. In an illustrative embodiment, the method 700 is implemented by the disaster recovery storage and VM control software 325. The example below is used to illustrate the method 700 and uses the six snapshots 400, 405, 410, 415, 420, 425 depicted in FIG. 4. In alternative embodiments, any suitable number of snapshots, each with any suitable number of blocks, can be used. In the example, economic constraints (e.g., RTO) limit the number of snapshots that can be stored in block storage 170 to two snapshots. Such information is stored in the RTO 600 for the source computer 105. When a snapshot is stored in block storage 170 it is sometimes referred to as a volume because the block storage 170 can be called volume block storage. Moving a snapshot to block storage 170 is also referred to as warming up the snapshot. Once a snapshot has been moved to block storage 170, it is called a warmed up snapshot or volume. In some embodiments, a virtual machine can be created using a warmed up volume in as little as several minutes. Once the virtual machine is created, the virtual machine can start executing the applications of the source computer 105 as they existed when the snapshot was captured.

In an illustrative embodiment, the method 700 is an iterative process that is run every time that a new snapshot from the source computer 105 is stored in the object storage 160. In alternative embodiments, the method 700 can be performed at regular intervals that do not correspond with capturing a new snapshot. In the example using FIG. 4, the RTO 600 for the source computer 105 specifies in the maximum snapshots in block storage field 620 that only two snapshots can be warmed up in the block storage 170 at a time. Such a constraint can be driven, for example, by the cost of storing data in the block storage 170. Using the embodiment illustrated in FIG. 7, the maximum number of blocks in the block storage 615 field is set to zero because in the present embodiment entire snapshots are stored in the block storage 170, not individual blocks. Block storage will be further discussed below with reference to FIG. 8.

In step 702, the variables of the method 700 are initialized and two of the six snapshots 400, 405, 410, 415, 420, 425 stored in object storage 160 are randomly selected to be candidate centroids. In alternative embodiments, the two snapshots selected to be the candidate centroids can be chosen based on any suitable information (e.g., the first two, the last two, the first and the last snapshots can be chosen, etc.). The two centroids represent the current candidates for the two snapshots that will be warmed up by moving them to the block storage 170. The method 700 can be used to determine that either the two initially selected snapshots are the best snapshots for warming or the method 700 will replace the two (or one of the two) initially selected snapshots with the two best snapshots for warming. For this example, the first centroid, which is referenced as centroids[c1], is set to s1, which is snapshot 1 (400) and the second centroid, which is referenced as centroids[c2], is set to s2, which is snapshot 2 (405).

Each centroid has associated with it a single cluster of snapshots. To assign snapshots to a cluster, the distance between each snapshot and each candidate centroid is determined. Each snapshot is assigned to the cluster with the lowest determined distance from the candidate centroid associated with that cluster.

In step 705, the distance between each of the six snapshots 400, 405, 410, 415, 420, 425 and each of the two centroids is determined. For example:
centroids[c1]:
  dist(s1,s1)=0
  dist(s1,s2)=2
  dist(s1,s3)=2
  dist(s1,s4)=3
  dist(s1,s5)=4
  dist(s1,s6)=4
centroids[c2]:
  dist(s2,s1)=2
  dist(s2,s2)=0
  dist(s2,s3)=2
  dist(s2,s4)=4
  dist(s2,s5)=3
  dist(s2,s6)=3

Each snapshot is assigned to one of the two clusters based on the determined distance between each centroid and the snapshot with the snapshot assigned to the cluster associated with the centroid having the shortest distance to the snapshot. If the distance is the same between a snapshot and the two (or more) centroids, the snapshot is placed by default in the first cluster (cl1), which is associated with the first centroid. In alternative embodiments, any suitable method can be used to determine which centroid snapshots should be placed with when the distance is the same between the snapshot and two (or more) centroids.

In the example above, cluster cl1 is associated with centroids[c1] and cluster cl2 is associated with centroids[c2]. After determining the shortest distances, snapshots s1 400, s3 410, and s4 415 are assigned to cluster cl1, which is associated with centroid c1. Snapshot s2 405, s5 420, and s6 425 are assigned to cluster cl2, which is associated with centroid c2.

In step 710, the centroids are recomputed using the snapshots assigned to each cluster. In an illustrative embodiment, the recomputation involves calculating and adding the distances from each snapshot in a cluster to every other snapshot in the same cluster. The snapshot with the lowest combined distance to each of the other snapshots becomes the next candidate centroid. The calculations to determine the first candidate centroid are as follows:
For cluster cl1, which includes snapshots (s1, s3, s4):
  s1: dist(s1,s1)=0, dist(s1,s3)=2, dist(s1,s4)=3
    Total distance for s1=0+2+3=5
  s3: dist(s3,s1)=2, dist(s3,s3)=0, dist(s3,s4)=4
    Total distance for s3=2+0+4=6
  s4: dist(s4,s1)=3, dist(s4,s3)=4, dist(s4,s4)=0
    Total distance for s3=3+4+0=7
For cluster cl2, which includes snapshots (s2, s5, s6):
  s2: dist(s2,s2)=0, dist(s2,s5)=3, dist(s2,s6)=3
    Total distance for s2=0+3+3=6
  s5: dist(s5,s2)=3, dist(s5,s5)=0, dist(s5,s6)=1
    Total distance for s5=3+0+1=4
  s6: dist(s6,s2)=3, dist(s6,s5)=1, dist(s6,s6)=0
    Total distance for s6=3+1+0=4

Looking at the total distance for each snapshot of cluster cl1, snapshot s1 has a distance of 5, which is lower than the distances for the other snapshots in cluster cl1. Therefore, snapshot s1 remains assigned to the snapshot for candidate centroids[c1].

Looking at the total distance for each snapshot of cluster cl2, snapshots s5 and s6 each have a distance of 4, which is lower than the distance of snapshot s2. Therefore, one of snapshots s5 and s6 are chosen to be assigned to be the next snapshot for candidate centroids[c2]. Any suitable method (e.g., randomization) can be used for choosing a snapshot among snapshots that each have the lowest distance. In this example, snapshot s5 is chosen at because s5 is before s6.

In step 715, it is determined that the centroid c2 did change from the last iteration, so the YES option 720 is followed and control is passed back to step 705.

In step 705, the members of each cluster are determined by determining the distance between each of the six snapshots 400, 405, 410, 415, 420, 425 and each centroid is determined as follows:
centroids[c1] is still set to s1:
   dist(s1,s1)=0
   dist(s1,s2)=2
   dist(s1,s3)=2
   dist(s1,s4)=3
   dist(s1,s5)=4
   dist(s1,s6)=4
centroids[c2] is now set to s5:
   dist(s5,s1)=4
   dist(s5,s2)=3
   dist(s5,s3)=2
   dist(s5,s4)=2
   dist(s5,s5)=0
   dist(s5,s6)=1
Based on the lowest distance value to a centroid, cluster c1 is assigned snapshots s1 400, s2 405, and s3 410, and cluster c2 is assigned snapshots s4 415, s5 420, and s6 425.

In step 710, the centroids are recomputed using the snapshots assigned to each centroid. In some embodiments, the recomputation involves calculating and adding the distances from each snapshot in a cluster to every other snapshot in the same cluster. The snapshot with the lowest combined distance to each of the other snapshots becomes the next candidate centroid. The calculations to determine the first centroid are as follows:
For cluster cl1 which includes snapshots (s1, s2, s3):
   s1: dist(s1,s1)=0, dist(s1,s2)=2, dist(s1,s3)=2
      Total distance for s1=0+2+2=4
   s2: dist(s2,s1)=2, dist(s2,s2)=0, dist(s2,s3)=1
      Total distance for s2=2+0+1=3
   s3: dist(s3,s1)=2, dist(s3,s2)=1, dist(s3,s3)=0
      Total distance for s3=2+1+0=3
For cluster cl2 which includes snapshots (s4, s5, s6):
   s4: dist(s4,s4)=0, dist(s4,s5)=2, dist(s4,s6)=3
      Total distance for s4=0+2+3=5
   s5: dist(s5,s4)=2, dist(s5,s5)=0, dist(s5,s6)=1
      Total distance for s5=2+0+1=3
   s6: dist(s6,s4)=3, dist(s6,s5)=1, dist(s6,s6)=0
      Total distance for s6=3+1+0=4
Looking at the total distance for each snapshot of cluster cl1, snapshots s2 405 and s3 410 each have a distance of 2, which is lower than the distance for snapshot s1 400. As noted above, any suitable method can be used to choose among snapshots s2 405 and s3 410. In this example, snapshot s2 is assigned to be the snapshot for candidate centroids[c1] because snapshot s2 is before snapshot s3.

Looking at the total distance for each snapshot of cluster cl2, snapshot s5 has a distance of 3, which is lower than the distances for the other snapshots in cluster cl2. Therefore, snapshot s5 remains assigned to be the snapshot for candidate centroids[c2].

In step 715, it is determined that the centroid c1 did change from the last iteration, so the YES option 720 is followed and control is passed back to step 705.

In step 705, the members of each cluster are determined by determining the distance between each of the six snapshots 400, 405, 410, 415, 420, 425 and each centroid is determined as follows:
centroids[c1] is now set to s2:
   dist(s2,s1)=2
   dist(s2,s2)=0
   dist(s2,s3)=2
   dist(s2,s4)=4
   dist(s2,s5)=3
   dist(s2,s6)=3
centroids[c2] is still set to s5:
   dist(s5,s1)=4
   dist(s5,s2)=3
   dist(s5,s3)=2
   dist(s5,s4)=2
   dist(s5,s5)=0
   dist(s5,s6)=1
Based on the lowest distance value to a centroid, cluster c1 is assigned snapshots s1 400, s2 405, and s3 410 and cluster c2 is assigned snapshots s4 415, s5 420, and s6 425.

In step 710, the centroids are recomputed using the snapshots assigned to each centroid. As above, the recomputation involves calculating and adding the distances from each snapshot in a cluster to every other snapshot in the same cluster. The snapshot with the lowest combined distance to each of the other snapshots becomes the next candidate centroid. The calculations to determine the first centroid are as follows:
For cluster cl1 which includes snapshots (s1, s2, s3):
   s1: dist(s1,s1)=0, dist(s1,s2)=2, dist(s1,s3)=2
      Total distance for s1=0+2+2=4
   s2: dist(s2,s1)=2, dist(s2,s2)=0, dist(s2,s3)=1
      Total distance for s2=2+0+1=3
   s3: dist(s3,s1)=2, dist(s3,s2)=1, dist(s3,s3)=0
      Total distance for s3=2+1+0=3
For cluster cl2 which includes snapshots (s4, s5, s6):
   s4: dist(s4,s4)=0, dist(s4,s5)=2, dist(s4,s6)=3
      Total distance for s4=0+2+3=5
   s5: dist(s5,s4)=2, dist(s5,s5)=0, dist(s5,s6)=1
      Total distance for s5=2+0+1=3
   s6: dist(s6,s4)=3, dist(s6,s5)=1, dist(s6,s6)=0
      Total distance for s6=3+1+0=4
Looking at the total distance for each snapshot of cluster cl1, snapshots s2 405 and s3 410 each have a distance of 2, which is lower than the distance for snapshot s1 400. As noted above, any suitable method can be used to choose among snapshots s2 405 and s3 410. In this example, snapshot s2 is assigned to be the snapshot for candidate centroids[c1] because snapshot s2 is before snapshot s3. In some embodiments, if multiple snapshots have the lowest total distance, the snapshot previously assigned for candidate centroids[c1] is chosen.

Looking at the total distance for each snapshot of cluster cl2, snapshot s5 has a distance of 3, which is lower than the distances for the other snapshots in cluster cl2. Therefore, snapshot s5 remains assigned to be the snapshot for candidate centroids[c2].

In step 715, it is determined that the centroids for c1 and c2 have not changed since the prior iteration. The NO option 725 is followed and control passes to step 730.

In step 730, a copy of the snapshots for centroids c1 and c2 are moved from the object storage 160 to the block storage 170 in a process known as warming up the snapshots. In this case, snapshot s2 405 and snapshot s5 425 are moved to block storage 170. It should be noted that the maximum distance for any of other four snapshots 400, 405, 415, 420 is no more than two from one of the two centroid snapshots 410, 425. Accordingly, by storing snapshots s2 and s5, recovery time for the other four snapshots 400, 405, 415, 420 is dramatically reduced compared to recovery completely from object storage 160. This is because half the blocks for each of the four snapshots are stored in block storage 170.

Figure 8:
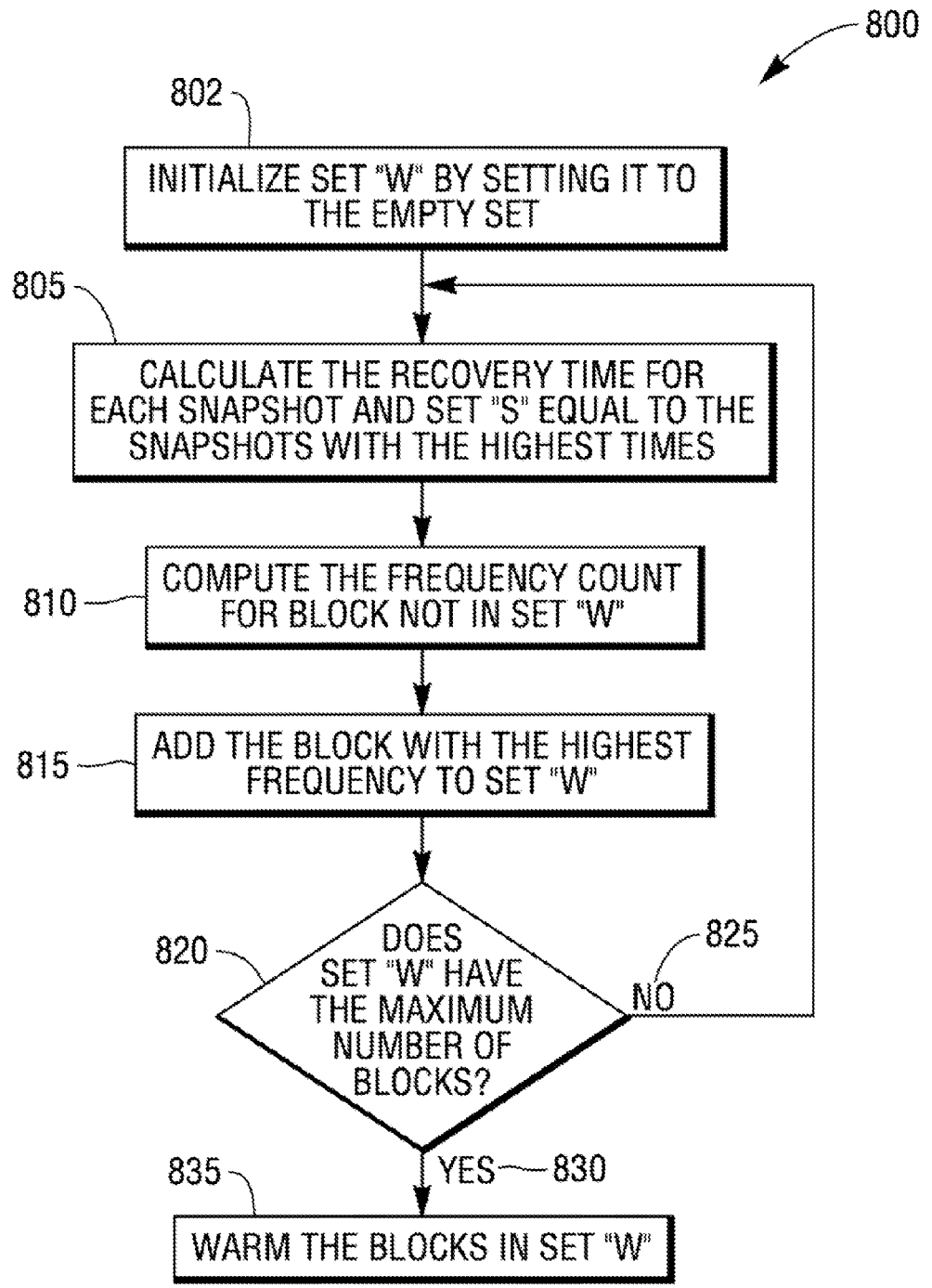
FIG. 8 is a flowchart of a method for determining appropriate blocks of data to move to block storage in accordance with an illustrative embodiment.

FIG. 8 is a flowchart of a method 800 for determining appropriate blocks of data to move to block storage 170 in accordance with an illustrative embodiment. In alternative embodiments, additional, fewer, and/or different operations may be performed. Also, the use of arrows and the order of listed operations is not meant to be limiting as to the order or flow of operations. In some embodiments, it may not be possible to meet recovery time objectives 600, but the present disclosure provides an improved solution that comes closer to meeting the recovery time objectives 600. The method 800 is implemented by the disaster recovery storage and VM control software 325. Warming is based on individual blocks and not whole snapshots, each of which includes one or more blocks. In an example using FIG. 4, the RTO 600 has the maximum snapshots in the block storage 620 field set to zero. In alternative embodiments, the method 800 can be implemented regardless of whether recovery time objectives 600 can be met.

For the purposes of the following example, economic constraints limit the number of blocks of data that can be loaded into the block storage 170 to five blocks. The example uses the snapshots and blocks illustrated in FIG. 4. The block limit information is stored in the RTO 600 in the maximum blocks in block storage 615 field which is maintained by the disaster recovery control software 130. A copy of the RTO 600 for the source computer 105 is available to the disaster recovery storage and VM control software 325 to use and/or reference.

The six snapshots 400, 405, 410, 415, 420, 425 of FIG. 4 include a total of eleven different blocks of data. The different blocks are named "BOB," "ALICE," "CAROL," "DAVE," "ERIN," "WENDY," "SAM," "EVE," "FRANK," "OSCAR," and "KEITH." According to the maximum blocks in block storage 615 field in this example, only five of the blocks can be stored in the block storage 170. The method 800 is used to identify the five blocks out of the eleven possible blocks that have the highest probability of meeting the recovery time specified in the RTO 600. The five identified blocks are moved into the block storage 170. The five blocks are the blocks that allow for the quickest recovery of any of the six snapshots 400, 405, 410, 415, 420, 425 in the event of a backup.

A number of functions and sets are used by the method 800 illustrated in FIG. 8. In alternative embodiments, any suitable functions and sets can be used. In an illustrative embodiment, set "W" contains the blocks that have been selected for warming. Initially, set "W" is empty. Set "SS" contains all of the snapshots. In the example above, set "SS" contains the six snapshots 400, 405, 410, 415, 420, 425 of FIG. 4. Variable "s" is defined as a reference to any of the snapshots. Set "BB" contains all of the different blocks. In the example above, set "BB" contains the eleven different blocks that comprise the six snapshots. Variable "b" is defined as a reference to any of the eleven different blocks. Function d(s) determines the recovery time for snapshot "s" using the blocks currently in set "W." The recovery time is measured in the number of blocks in a snapshot that are not stored in the block storage 170 and, therefore, are to be loaded into the block storage 170 for recovery. Set "S" contains the snapshots with the highest calculated recovery time given the current blocks in set "W." Function f(b) is the frequency count of block b in set "S" with the blocks in set "W" removed.

In step 802, variables are initialized. Set "W" includes the blocks that are to be warmed (e.g., by moving them to the block storage 170). At the beginning of the method 800, no blocks have been selected, and set "W" is set to the empty set. The method 800 is an iterative process and is performed until the proper number of blocks have been selected for warming. The maximum snapshots in block storage 620 field of the RTO 600 for the source computer 105 has been set to five in the example above. Accordingly, only five blocks can be moved into the block storage 170, and the method 800 will repeat until five blocks are selected.

In step 805, the recovery time for each snapshot in set "SS" is calculated and set "S" is set to the snapshots with the highest recovery times. The recovery times for each snapshot are calculated as follows:
$d(s1)=4$
$d(s2)=4$
$d(s3)=4$
$d(s4)=4$
$d(s5)=4$
$d(s6)=4$ Because set "W" is empty, the recovery time for each snapshot is the number of blocks in the snapshot that need to be moved into the block storage 170, which is four for each snapshot. In the present iteration of the example, all snapshots have the same recovery time, and, as such, set "S" is set to include all six snapshots.

In step 810, the frequency count for each block of the snapshots in set "S" is calculated as follows:
$f(BOB)=3$
$f(ALICE)=3$
$f(CAROL)=2$
$f(DAVE)=1$
$f(ERIN)=1$
$f(EVE)=4$
$f(SAM)=3$
$f(FRANK)=3$
$f(OSCAR)=2$
$f(WENDY)=1$
$f(KEITH)=1$ Block "EVE" has the highest frequency count and is added to set "W." In some instances, multiple blocks may each have the highest frequency count (e.g., multiple blocks can each be in four snapshots). In such instances, only one block is selected to be added to set "W." Any suitable method can be used to select the block. For example, the selection can be random. In another example, the first block in the order is selected.

In step 820, the number of items in set "W" is compared to the maximum blocks that can be stored in the block storage 170, which in this example is five, to determine if the limit has been reached. Set "W" only has one item, so the limit has not been reached and control returns to step 805.

Second Iteration

In step 805, the recovery time for each snapshot in set "SS" is calculated using set "W" which is set to "EVE" and set "S" is set to the snapshots with the highest recovery times. The recovery times for each snapshot are calculated as follows:
$d(s1)=4$
$d(s2)=3$
$d(s3)=3$
$d(s4)=4$
$d(s5)=3$
$d(s6)=3$ Set "S" is set to the snapshots with the highest recovery times, which is s1 400 and s4 415.

In step 810, the frequency count for each block contained in the snapshots in set "S" is calculated as follows:
$f(BOB)=1$
$f(ALICE)=1$
$f(CAROL)=2$
$f(DAVE)=1$ f(FRANK)=1
f(OSCAR)=1
f(WENDY)=1

Block "CAROL" has the highest frequency count and is added to set "W."

In step 820, the number of items in set "W" is compared to the maximum blocks that can be stored in the block storage 170, which is five, to determine if the limit has been reached. Set "W" contains two items (blocks "EVE" and "CAROL") so the limit has not been reached and control returns to step 805.

Third Iteration

In step 805, the recovery time for each snapshot in set "SS" is calculated using set "W" which is set to "EVE" and "CAROL." Set "S" is set to the snapshots with the highest recovery times. The recovery times for each snapshot are calculated as follows:

$d(s1)=3$
$d(s2)=3$
$d(s3)=3$
$d(s4)=3$
$d(s5)=3$
$d(s6)=3$

Set "S" is now set to all six snapshots because they all have the highest recovery times.

In step 810, the frequency count for each block of the snapshots in set "S" is calculated as follows:

f(BOB)=3
f(ALICE)=3
f(DAVE)=1
f(ERIN)=1
f(SAM)=3
f(FRANK)=3
f(OSCAR)=2
f(WENDY)=1
f(KEITH)=1

In step 815, it is determined that blocks "BOB," "ALICE," "SAM," and "FRANK" have the highest frequency count. In the present example, "BOB" is added to set "W" because "BOB" occurs first. As mentioned above, any suitable method can be used to determine which of "BOB," "ALICE," "SAM," or "FRANK" should be chosen, such as randomly.

In step 820, the number of items in set "W" is compared to the maximum blocks that can be stored in the block storage 170, which in the present example is five, to determine if the limit has been reached. Set "W" contains three items (blocks "EVE," "CAROL," and "BOB") so the limit has not been reached and control returns to step 805.

Fourth Iteration

In step 805, the recovery time for each snapshot in set "SS" is calculated using set "W" which is set to "EVE," "CAROL," and "BOB." Set "S" is set to the snapshots with the highest recovery times. The recovery times for each snapshot are calculated as follows:

$d(s1)=2$
$d(s2)=2$
$d(s3)=2$
$d(s4)=3$
$d(s5)=3$
$d(s6)=3$

Set "S" is set to snapshots s4 415, s5 420, and s6 425 because they all have the highest recovery times.

In step 810, the frequency count for each block of the snapshots in set "S" is calculated as follows:

f(FRANK)=1
f(OSCAR)=2
f(WENDY)=1
f(SAM)=2
f(KEITH)=2

In step 815, it is determined that blocks "OSCAR", "SAM," and "KEITH" have the highest frequency count and "OSCAR" is added to set "W."

In step 820, the number of items in set "W" is compared to the maximum blocks that can be stored in the block storage 170, which in the present example is five, to determine if the limit has been reached. Set "W" contains four items (blocks "EVE," "CAROL," "BOB," and "OSCAR") so the limit has not been reached and control returns to step 805.

Fifth Iteration

In step 805, the recovery time for each snapshot in set "SS" is calculated using set "W" which is set to "EVE," "CAROL," "BOB," and "OSCAR." Set "S" is set to the snapshots with the highest recovery times. The recovery times for each snapshot are calculated as follows:

$d(s1)=2$
$d(s2)=2$
$d(s3)=2$
$d(s4)=2$
$d(s5)=2$
$d(s6)=3$

Set "S" is set to snapshot s6 425 because it has the highest recovery time.

In step 810, the frequency count for each block of the snapshots in set "S" is calculated as follows:

f(FRANK)=1
f(KEITH)=1
f(SAM)=1

In step 815, it is determined that blocks "FRANK," "KEITH," and "SAM" have the highest frequency count, and "FRANK" is added to set "W."

In step 820, the number of items in set "W" is compared to the maximum blocks that can be stored in the block storage 170, which in the present example is five, to determine if the limit has been reached. Set "W" contains five blocks (blocks "EVE", "CAROL," "BOB," "OSCAR," and "FRANK") and, therefore, the limit has been reached.

In step 835, the five identified blocks stored in set "W" are warmed by moving the blocks (blocks "EVE", "CAROL," "BOB," "OSCAR," and "FRANK") into the block storage 170. In the example above, each snapshot has two blocks stored in block storage 170. In alternative embodiments, each block determined to be included in set "W" is transferred (or transfer is initiated) before the next block is chosen.

Accordingly, it will take approximately the same amount of time for any of the snapshots to be recovered. That is, each of the snapshots will move two blocks from object storage 160 to block storage 170 if the snapshot is to be recovered. Accordingly, the average time to recovery is minimized across all of the snapshots.

Figure 9:
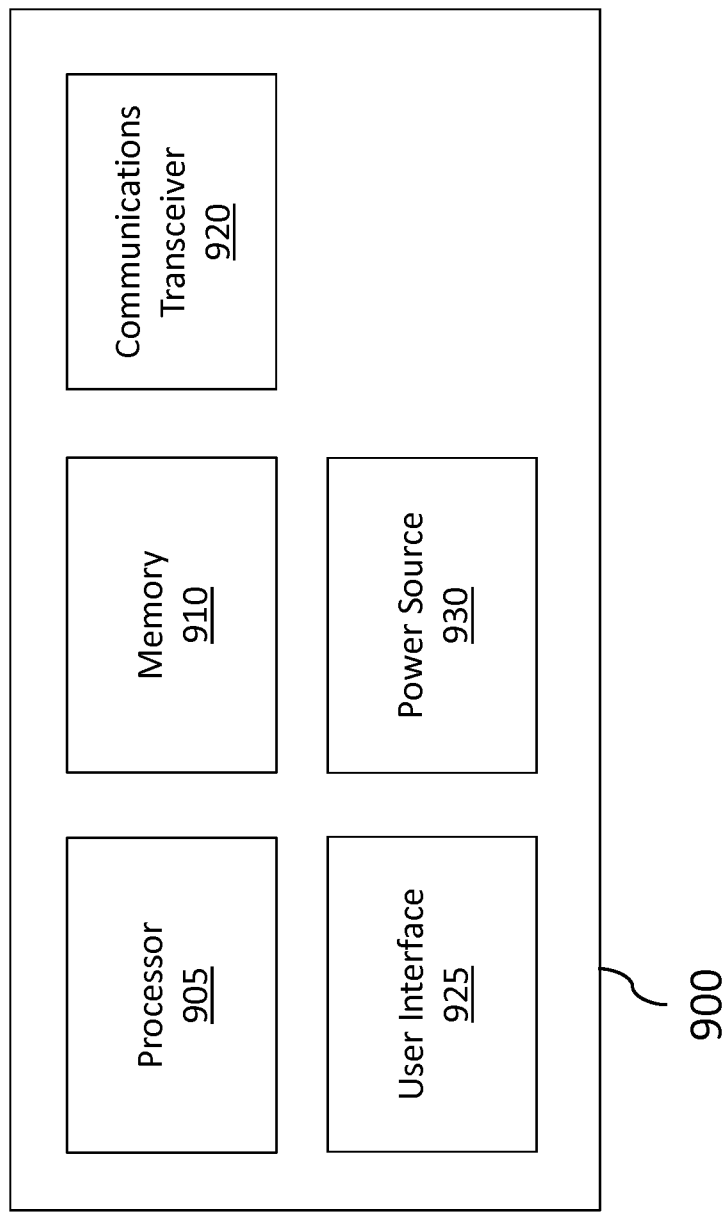
FIG. 9 is a block diagram of a computing device in accordance with an illustrative embodiment.

FIG. 9 is a block diagram of a computing device in accordance with an illustrative embodiment. In alternative embodiments, additional, fewer, and/or different elements may be used. A computing device 900 includes a processor 905, a memory 910, a communications transceiver 920, a power source 930, and a user interface 925. The disaster recovery system 100 can include one or more computing devices 900. For example, application server 105 can include an embodiment of computing device 900, user computer 155 can include an embodiment of computing device 900, cloud-based disk storage and virtual machine 180 can include an embodiment of computing device 900, etc.

In some embodiments, computing device 900 can include processor 905. Processor 905 can be configured to carry out and/or cause to be carried out one or more operations described herein. Processor 905 can execute instructions as known to those skilled in the art. The instructions may be carried out by one or more special purpose computers, logic circuits (e.g., programmable logic circuits (PLC)), and/or hardware circuits. Thus, processor 905 may be implemented in hardware, firmware, software, or any combination of these methods. The term "execution" is the process of running an application or the carrying out of the operation called for by an instruction. The instructions may be written using one or more programming languages, scripting languages, assembly languages, etc. Processor 905 executes an instruction, meaning that it performs the operations called for by that instruction. Processor 905 operably couples with memory 910, communications transceiver 920, power source 930, user interface 925, etc. to receive, to send, and to process information and to control the operations of the computing device 900. Processor 905 may retrieve a set of instructions from a permanent memory device such as a read-only memory (ROM) device and copy the instructions in an executable form to a temporary memory device that is generally some form of random access memory (RAM). Computing device 900 may include a plurality of processors that use the same or a different processing technology. In an illustrative embodiment, the instructions may be stored in memory 910.

In some embodiments, computing device 900 can include memory 910. Memory 910 can be an electronic holding place or storage for information so that the information can be accessed by processor 905 using any suitable method. Memory 910 can include, but is not limited to, any type of random access memory (RAM), any type of read-only memory (ROM), any type of flash memory, etc. such as magnetic storage devices (e.g., hard disk, floppy disk, magnetic strips, etc.), optical disks (e.g., compact disk (CD), digital versatile disk (DVD), etc.), smart cards, flash memory devices, solid state drives, etc. Computing device 900 may have one or more computer-readable media that use the same or a different memory media technology. Computing device 900 may have one or more drives that support the loading of a memory medium such as a CD, a DVD, a flash memory card, etc.

In some embodiments, computing device 900 includes a communications transceiver 920. Communications transceiver 920 can be configured to receive and/or transmit information. In some embodiments, communications transceiver 920 communicates information via a wired connection, such as an Ethernet connection, one or more twisted pair wires, coaxial cables, fiber optic cables, etc. In some embodiments, communications transceiver 920 can communicate information via a wireless connection using microwaves, infrared waves, radio waves, spread spectrum technologies, satellites, etc. Communications transceiver 920 can be configured to communicate with another device using cellular networks, local area networks, wide area networks, the Internet, etc. In some embodiments, one or more of the elements of computing device 900 communicate via wired or wireless communications.

In some embodiments, computing device 900 includes power source 930. Power source 930 can be configured to provide electrical power to one or more elements of computing device 900. In some embodiments, power source 930 can include an alternating power source, such as available line voltage (e.g., 120 Volts (V) alternating current at 60 Hertz in the United States). Power source 930 can include one or more transformers, rectifiers, etc. to convert electrical power into power useable by the one or more elements of computing device 900, such as 1.5 V, 8 V, 12 V, 24 V, etc. Power source 930 can include one or more batteries.

In some embodiments, computing device 900 includes user interface 925. User interface 925 can be configured to receive and/or provide information from/to a user. User interface 925 can be any suitable user interface. User interface 925 can be an interface for receiving user input and/or machine instructions for entry into computing device 900 using any suitable method. User interface 925 may use various input technologies including, but not limited to, a keyboard, a stylus and/or touch screen, a mouse, a track ball, a keypad, a microphone, voice recognition, motion recognition, disk drives, remote computing devices, input ports, one or more buttons, dials, joysticks, etc. to allow an external source, such as a user, to enter information into computing device 900. User interface 925 can be used to navigate menus, adjust options, adjust settings, adjust display, etc. User interface 925 can be configured to provide an interface for presenting information from computing device 900 to external systems, users, or memory. For example, user interface 925 can include an interface for a display, a printer, a speaker, alarm/indicator lights, a network interface, a disk drive, a computer memory device, etc. User interface 925 can include a color display, a cathode-ray tube (CRT), a liquid crystal display (LCD), a plasma display, an organic light-emitting diode (OLED) display, etc.

In an illustrative embodiment, any of the operations described herein can be implemented at least in part as computer-readable instructions stored on a computer-readable memory. Upon execution of the computer-readable instructions by a processor, the computer-readable instructions can cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method for storing disaster recovery data comprising:
receiving a plurality of copies of data stored by a first memory storage system, each of the plurality of copies comprising a plurality of blocks of data;
storing, in a second memory storage system, the plurality of copies in an object-oriented format;
determining, using recovery time objectives, a number of the blocks to be stored in a block-oriented format;
selecting:
(i) a subset of the plurality of copies, each copy of the subset having the fewest number of blocks selected to be stored in the block-oriented format; and
(ii) a block that is present in the largest number of copies in the subset;
repeating the selecting step until a selected number of blocks is equal to the determined number of blocks; and
storing, in a third memory storage system, the determined number of selected blocks in the block-oriented format.

2. The method of claim 1, said receiving the plurality of copies of data comprising receiving each copy that represents the data at a unique time.

3. The method of claim 1, said determining the number of the plurality of copies comprising determining, using a maximum desired time to restore data of the first memory device from one of the plurality of copies, the number of the plurality of copies to be stored in the block-oriented format.

4. The method of claim 1, said determining the number of the plurality of copies comprising determining, using a maximum desired financial cost to store the plurality of copies, the number of the plurality of copies to be stored in the block-oriented format.

5. The method of claim 4, said determining the number of the blocks to be stored in the block-oriented format comprising:
receiving a total number of blocks to be stored in either the object-oriented format or the block-oriented format;
receiving a per-block storage cost for blocks stored in the object-oriented format;
receiving a per-block storage cost for blocks stored in the block-oriented format; and
determining, using the per-block storage cost for blocks stored in the object-oriented format and the per-block storage cost for blocks stored in the block-oriented format, a number of blocks to be stored in the object-oriented format and the number of blocks to be stored in the block-oriented format by maximizing the number of blocks to be stored in the block-oriented format without exceeding the desired financial cost.

6. The method of claim 5, said determining the number of blocks to be stored in the object-oriented format and the number of blocks to be stored in the block-oriented format based on the total number of blocks to be stored being equal to the sum of the number of blocks to be stored in the object-oriented format and the number of blocks to be stored in the block-oriented format.

7. The method of claim 1, said receiving the plurality of copies comprising receiving the plurality of copies from a plurality of memory storage devices of the first memory storage system, the plurality of memory storage devices being remote from one another.

8. The method of claim 7, further comprising transmitting to one of the plurality of memory storage devices blocks stored in the object-oriented format and blocks stored in the block-oriented format that were received from the one of the plurality of memory storage devices.

9. A system for storing disaster recovery data comprising:
a transceiver configured to receive a plurality of copies of data stored by a first memory storage system, each of the plurality of copies comprising a plurality of blocks of data;
a second memory storage system configured to store the blocks of data in an object-oriented format;
a third memory storage system configured to store a number of the blocks in a block-oriented format; and
a processor operatively coupled to the transceiver, the second memory storage system, and the third memory storage system, the processor:
determining, using recovery time objectives, the number of the blocks to be stored in the block-oriented format;
selecting:
(i) a subset of the plurality of copies, each copy of the subset having the fewest number of blocks selected to be stored in the block-oriented format; and
(ii) a block that is present in the largest number of copies in the subset;
repeating the selecting step until a selected number of blocks is equal to the determined number of blocks; and
storing, in the third memory storage system, the determined number of selected blocks in the block-oriented format.

10. The system of claim 9, each copy of the data stored by the first memory storage system being a copy of the data at a unique time.

11. The system of claim 9, said determining the number of the plurality of copies comprising determining, using a maximum desired time to restore data of the first memory device from one of the plurality of copies, the number of the plurality of copies to be stored in the block-oriented format.

12. The system of claim 9, said determining the number of the plurality of copies comprising determining, using a maximum desired financial cost to store the plurality of copies, the number of the plurality of copies to be stored in the block-oriented format.

13. The system of claim 12, to determine the number of the blocks to be stored in the block-oriented format, the processor:
receiving a total number of blocks to be stored in either the object-oriented format or the block-oriented format;
receiving a per-block storage cost for blocks stored in the object-oriented format;
receiving a per-block storage cost for blocks stored in the block-oriented format; and
determining, using the per-block storage cost for blocks stored in the object-oriented format and the per-block storage cost for blocks stored in the block-oriented format, a number of blocks to be stored in the object-oriented format and the number of blocks to be stored in the block-oriented format by maximizing the number of blocks to be stored in the block-oriented format without exceeding the desired financial cost.

14. The system of claim 13, said determining the number of blocks to be stored in the object-oriented format and the number of blocks to be stored in the block-oriented format based on the total number of blocks to be stored being equal to the sum of the number of blocks to be stored in the object-oriented format and the number of blocks to be stored in the block-oriented format.

15. The system of claim 9, the first memory storage system comprising a plurality of memory storage devices that are remote from one another.

16. The system of claim 15, the processor further transmitting to one of the plurality of memory storage devices blocks stored in the object-oriented format and blocks stored in the block-oriented format that were received from the one of the plurality of memory storage devices.

17. A non-transitory computer-readable medium having computer-readable instructions stored thereon that, upon execution by a processor, cause a device to perform operations, the instructions comprising:
instructions to receive a plurality of copies of data stored by a first memory storage system, each of the plurality of copies comprising a plurality of blocks of data;
instructions to store, in a second memory storage system, the plurality of copies in an object-oriented format;
instructions to determine, using recovery time objectives, a number of the blocks to be stored in a block-oriented format;
instructions to select:
(i) a subset of the plurality of copies, each copy of the subset having the fewest number of blocks selected to be stored in the block-oriented format; and
(ii) a block that is present in the largest number of copies in the subset;
instructions to repeat the instructions to select until a selected number of blocks is equal to the determined number of blocks; and
instructions to store, in a third memory storage system, the determined number of selected blocks in the block-oriented format.

18. The non-transitory computer-readable medium of claim 17, the instructions to determine the number of the plurality of copies comprising instructions to determine, using a maximum desired financial cost to store the plurality of copies, the number of the plurality of copies to be stored in the block-oriented format.

19. The non-transitory computer-readable medium of claim 18, the instructions to determine the number of the blocks to be stored in the block-oriented format comprising:
instructions to receive a total number of blocks to be stored in either the object-oriented format or the block-oriented format;
instructions to receive a per-block storage cost for blocks stored in the object-oriented format;
instructions to receive a per-block storage cost for blocks stored in the block-oriented format; and
instructions to determine, using the per-block storage cost for blocks stored in the object-oriented format and the per-block storage cost for blocks stored in the block-oriented format, a number of blocks to be stored in the object-oriented format and the number of blocks to be stored in the block-oriented format by maximizing the number of blocks to be stored in the block-oriented format without exceeding the desired financial cost.

20. The non-transitory computer-readable medium of claim 17, the instructions to receive the plurality of copies comprising instructions to receive the plurality of copies from a plurality of memory storage devices of the first memory storage system, the plurality of memory storage devices being remote from one another.

* * * * *